US009239705B2

(12) United States Patent
Chandaria et al.

(10) Patent No.: US 9,239,705 B2
(45) Date of Patent: Jan. 19, 2016

(54) METHOD AND APPARATUS FOR CUSTOMIZED SOFTWARE DEVELOPMENT KIT (SDK) GENERATION

(71) Applicant: Ciambella Ltd., Tortola (VG)

(72) Inventors: Trisala Chandaria, New York, NY (US); Jean-Baptiste Leonelli, New York, NY (US)

(73) Assignee: Ciambella Ltd., Tortola (VG)

(*) Notice: Subject to any disclaimer, the term of this patent is extended or adjusted under 35 U.S.C. 154(b) by 0 days.

(21) Appl. No.: 14/307,208

(22) Filed: Jun. 17, 2014

(65) Prior Publication Data

US 2014/0372963 A1 Dec. 18, 2014

Related U.S. Application Data

(60) Provisional application No. 61/836,628, filed on Jun. 18, 2013, provisional application No. 61/842,906, filed on Jul. 3, 2013, provisional application No. 61/847,819, filed on Jul. 18, 2013.

(51) Int. Cl.
*G06F 9/44* (2006.01)
*G06F 9/445* (2006.01)

(52) U.S. Cl.
CPC .............. *G06F 8/00* (2013.01); *G06F 9/44536* (2013.01)

(58) Field of Classification Search
CPC ........................................................ G06F 8/00
USPC ................................................ 717/100–123
See application file for complete search history.

(56) References Cited

U.S. PATENT DOCUMENTS

| | | | |
|---|---|---|---|
| 6,324,681 B1* | 11/2001 | Sebesta ..................... | G06F 8/20 707/999.01 |
| 6,490,723 B1* | 12/2002 | Bearden et al. ............... | 717/174 |
| 7,043,715 B1* | 5/2006 | Bauer et al. .................. | 717/107 |
| 7,127,705 B2* | 10/2006 | Christfort ................. | G06F 8/20 707/999.004 |
| 7,784,030 B2* | 8/2010 | Christfort ................. | G06F 8/20 709/203 |
| 8,352,903 B1 | 1/2013 | Friedman | |
| 8,694,954 B2* | 4/2014 | Ortiz ........................ | G06F 8/38 715/223 |
| 2002/0078168 A1* | 6/2002 | Christfort ................. | G06F 8/20 709/217 |
| 2003/0023839 A1* | 1/2003 | Burkhardt et al. ............... | 713/1 |
| 2003/0120707 A1* | 6/2003 | Bogdan et al. ............... | 709/106 |
| 2011/0154305 A1 | 6/2011 | Leroux et al. | |
| 2012/0233589 A1 | 9/2012 | Mruthyunjaya et al. | |
| 2014/0258986 A1* | 9/2014 | Wang et al. ................... | 717/126 |

OTHER PUBLICATIONS

Battaglia, F.; Iannizzotto, G.; La Rosa, F., "An open and portable software development kit for handheld devices with proprietary operating systems," Consumer Electronics, IEEE Transactions on, vol. 55, No. 4, pp. 2436-2444, Nov. 2009.*

(Continued)

*Primary Examiner* — Satish Rampuria
(74) *Attorney, Agent, or Firm* — Moser Taboada (57) ABSTRACT

A system and method operative to generate a custom software development kit (SDK) in a virtual code provider (VCP) including analyzing a plurality of process code corresponding to a plurality of predefined functions offered by at least one classical service component (CSC). The method further includes retrieving native SDKs for each function of the plurality of functions, receiving a selection of at least two functions among the plurality of predefined functions, and parsing SDK code from the native SDKs for the at least two selected functions. The method linking the parsed SDK code and storing the linked parsed SDK code as a custom SDK.

14 Claims, 7 Drawing Sheets

(56) References Cited

OTHER PUBLICATIONS

Benso, A.; Chiusano, S.; Prinetto, P., "A software development kit for dependable applications in embedded systems," Test Conference, 2000. Proceedings. International, pp. 170-178, 2000.*

Kasai, H., "Embedded middleware and software development kit for area-based distributed mobile cache system," Consumer Electronics, IEEE Transactions on, vol. 59, No. 1, pp. 281-289, Feb. 2013.*
International PCT Search Report, PCT/US2014/042780, 10 Pages, Date of Mailing Nov. 3, 2014.

* cited by examiner

METHOD AND APPARATUS FOR CUSTOMIZED SOFTWARE DEVELOPMENT KIT (SDK) GENERATION

CROSS-REFERENCE TO RELATED APPLICATION

This application claims priority to U.S. Provisional Patent Application No. 61/836,628 filed on Jun. 18, 2013, U.S. Provisional Patent Application No. 61/842,906 filed on Jul. 3, 2013, and U.S. Provisional Patent Application No. 61/847,819 filed on Jul. 18, 2013 which are incorporated by reference herein in their entirety.

BACKGROUND

The growth and integration of computer programming languages has expanded many capabilities of existing languages. Each language offers particular advantages and disadvantages in terms of respective size, execution speed, and various functionality within platforms and devices. As such, some specific languages are made to only work with corresponding devices and users must often be familiar or even be experts with multiple programming languages. In addition, the nature of building modern applications has forced developers to learn multiple languages. Such that writing an application is no longer limited to using one programming language. Integrating and learning multiple languages is a difficult burden, often requiring months or years of training for a programmer/developer to reach a sufficient coding proficiency.

Applications may be composed of various languages and if deployed on servers, requires programmers to learn a front end language, a server language, and a back end language. Front end technologies are also made of several different languages (HTML, Javascript, etc.) to further add to programming complexity.

In addition, more computing occurs over a network and/or the Internet (i.e., "CLOUD computing"), programming with various software development kits (SDKs) and application programming interfaces (APIs) becomes a cumbersome necessity for developers. Emerging services such as social media (TWITTER, FACEBOOK, and the like), data storage (DROPBOX, CLOUD DRIVE, and the like), and financial transactions (PAYPAL, AMAZON, EBAY, and the like) also increase the programming burden on programmers as each service may require its own SDK or API to implement processes offered by the service. For example, TWEETING on TWITTER requires a different code base than for posting a picture on TUMBLR. Using these services also may not be conveniently shown until after applications are deployed on the service, which also may have irreparable results. In other words, programming across multiple platforms, languages, and services remains exceedingly complex to learn in combination with understanding accompanying SDKs and APIs of remote services. Subsequently, any programs using multiple services require a large code base and accompanying SDKs and occupy a large amount of memory even if only a fraction of the offered functionalities are used.

Thus, there is a need in the art for generating a custom SDK containing select functionality.

SUMMARY OF THE INVENTION

Embodiments of the present invention generally relate to a method, apparatus, and system for code virtualization with a customized SDK. Specifically, by utilizing a pre-generated code library, customized SDK, and snippet generator located on a remote server, a program on a user device leverages multiple services across multiple platforms and programming languages with minimal memory storage space. The user device stores a customized SDK that contains only the code required for processes selected by the user. The user device receives a code snippet and/or customized SDK so as to execute at least one remote process call on the remote server, and also in turn deploy the process in the native language of a target device (e.g., a different remote server) substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the described following embodiments, a "process" shall refer to a ready-to-run code base or pre-generated process code for a function that is stored on an execution computer (e.g., server, personal computer, mobile device, etc.). Each process is uniquely identified by name, process ID, icon, or other identifier indicating functionality of the process to the user of an integrated development environment (IDE). "Execution" shall refer to the launch of a process on a computer (local or remote, or CLOUD based). A "bundle" shall refer to a collection of processes organized by a common attribute (API name, common parameters, SDK, parameter names, and the like). A "snippet" shall refer to a generated block of customized code to be inserted into a program with a corresponding programming language selected by a user for calling a remote process. Often, the language selected is that of a programming language specified by the user to be implemented in an application and/or IDE on a user device.

As described, in the following embodiments, "custom" and "customized" SDK shall refer to a SDK tailored to include only the necessary SDK data to implement functions selected by the user. Functions (e.g., processes) are descriptive terms and/or images for presentation to the user that describe the operation of process code. In some embodiments, functions include process code.

Embodiments disclosed herein relate to a code library on a remote server (e.g. "in the CLOUD") wherein the user can remotely select a function and then download a corresponding snippet and/or custom SDK to access the process from a local application or software program. The snippet allows for a remote process call on the remote server to execute a process on the server or deploy the process on a different remote server or remote. The user device uses a virtualized SDK such that the snippet may communicate with a remote platform on the execution computer. The remote platform includes virtualized components of additional services (e.g., compilers, e-mail, AMAZON, TWITTER, EBAY, DROPBOX, and the like) along with corresponding SDKs and APIs for the services. As will be discussed further below, the virtualized SDK is customized to include only the code necessary to execute specific functions selected by a user. Embodiments with the customized SDK require less memory and in some embodiments, retrieved faster than if not customized. A computing platform includes a hardware architecture and a software framework (including application frameworks), where the combination allows software to run. Typical platforms include a computer architecture, operating system and Runtime libraries.

A typical SDK includes many tools, libraries, documentation and sample code that would help a programmer to develop an application for a software package, software framework, hardware platform, computer system, video game console, operating system, or similar development platform. An API defines a set of rules that should be followed by the programs to communicate with one another. The rules specify how the routines, data structures, etc. should be defined in order for two applications to communicate with each another. The API is an interface that allows software programs to interact with each other, whereas a SDK is a set of tools that can be used to develop software applications targeting a specific platform. In some instances, an SDK may include an API.

Figure 1:
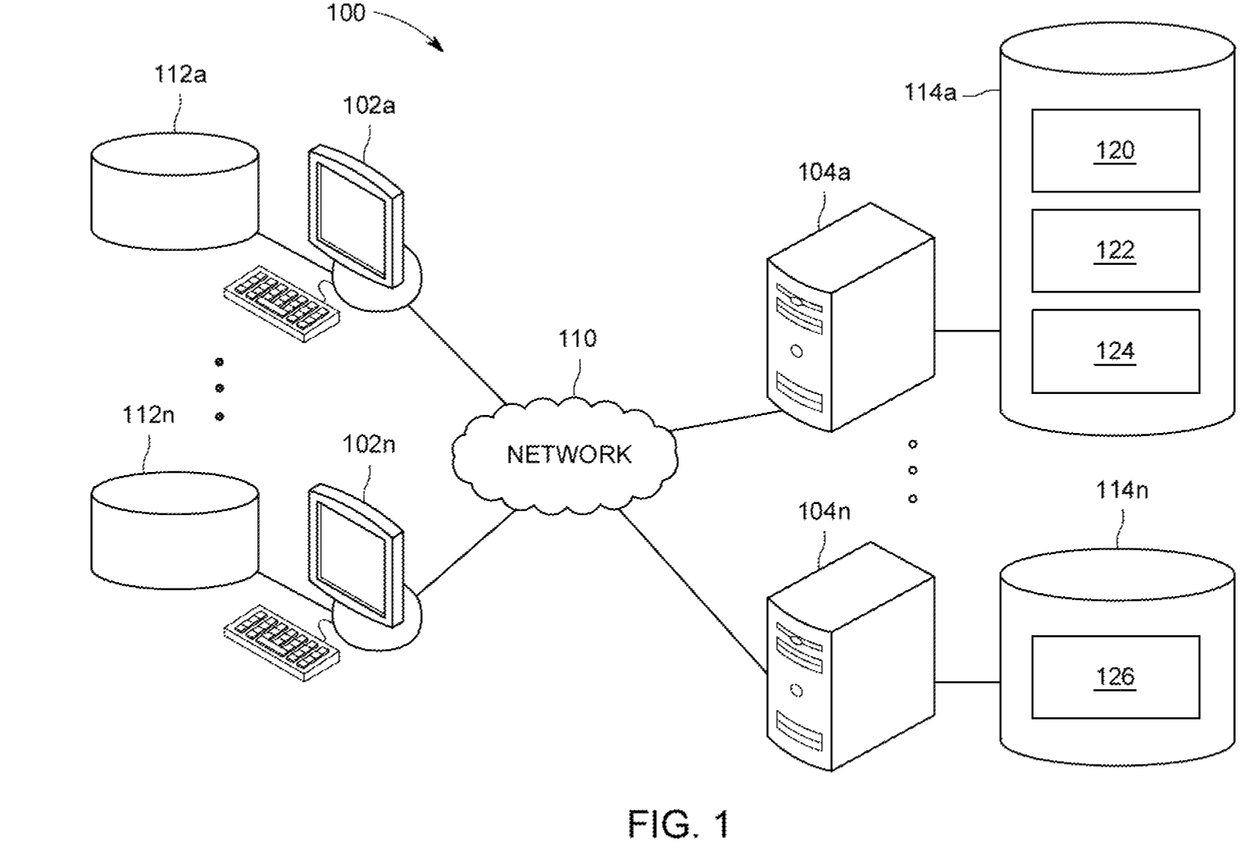
FIG. 1 is an illustration of a code virtualization system in accordance with one or more exemplary embodiments of the present invention.

FIG. 1 is an illustration of a code virtualization system 100 in accordance with one or more embodiments of the present invention. The system 100 comprises at least one user device (102a . . . 102n), a network 110, and at least one remote server (104a . . . 104n). The at least one user device (102a . . . 102n) comprises an electronic device capable of storing and executing a program such as a personal computer, server, virtual server, microcontroller (MCU) and controller, sensor, actuator, edge device connected to a gateway, application-specific integrated circuit (ASIC), micro-processor and processor, cellular phone, smart phone, tablet, laptop, and the like.

Each user device (102a . . . 102n) comprises a corresponding memory (112a . . . 112n) storing code necessary to connect to and authenticate into the network 110 to connect to at least one remote server (104a . . . 104n). In some embodiments, the memory (112a . . . 112n) stores an IDE for receiving and deploying snippets from the at least one remote server (104a . . . 104n).

The network 110 may comprise at least one of or combination of a wired and/or wireless network such as: a local area network (LAN), wide area network (WAN), wireless local area network WLAN, cellular network, Wi-Fi, Internet, or Intranet networks. The at least one remote server (104a . . . 104n) may comprise a remote application server, web server, mail server, host server, database server, storage server, and the like. The at least one remote server (104a . . . 104n) comprises memory (114a . . . 114n) to store a remote platform 120 and execute particular process calls such through a custom SDK generator 122, a snippet correlation module 124, and an execution engine 126. In some embodiments, a snippet generator is stored on the user device (102a . . . 102n) to generate snippets that call remote processes suing the custom SDK. The memory (114a . . . 114n) may also store a user interface module, database of user profiles/accounts, collection of processes, SDKs, and associated parameters to link and execute the processes across other servers 104n (e.g., FACEBOOK, TWITTER, e-mail, SMS, MMS, FTP, and the like) on the network 110.

The execution engine 126 processes calls to routines in the libraries by correlating an identified routine called and running/executing the process using the call parameters in snippets identified by the custom SDK. In some embodiments, the execution engine 126 may send the output of the process call to another process call or the original process call.

In some embodiments, process call parameters are stored either on user device 102a or remote server 104a. In other embodiments, parameters for the process calls are specified directly by the user via pre-generated pre-defined fields presented to the user specified in a graphical user interface. In some embodiments, the graphical user interface is part of an IDE. The IDE utilizing snippets generated by the remote server 104a for integration into a program of a user selected programming language on the user device 102a.

In some embodiments, the IDE also executes remote process calls using the snippets on the server 104a so as to deploy additional processes and access services offered on other servers 104n. The execution is facilitated by a custom SDK and virtualized platform that links the remote process calls to a corresponding virtual code provider (VCP) discussed further below in FIG. 2.

Figure 2:
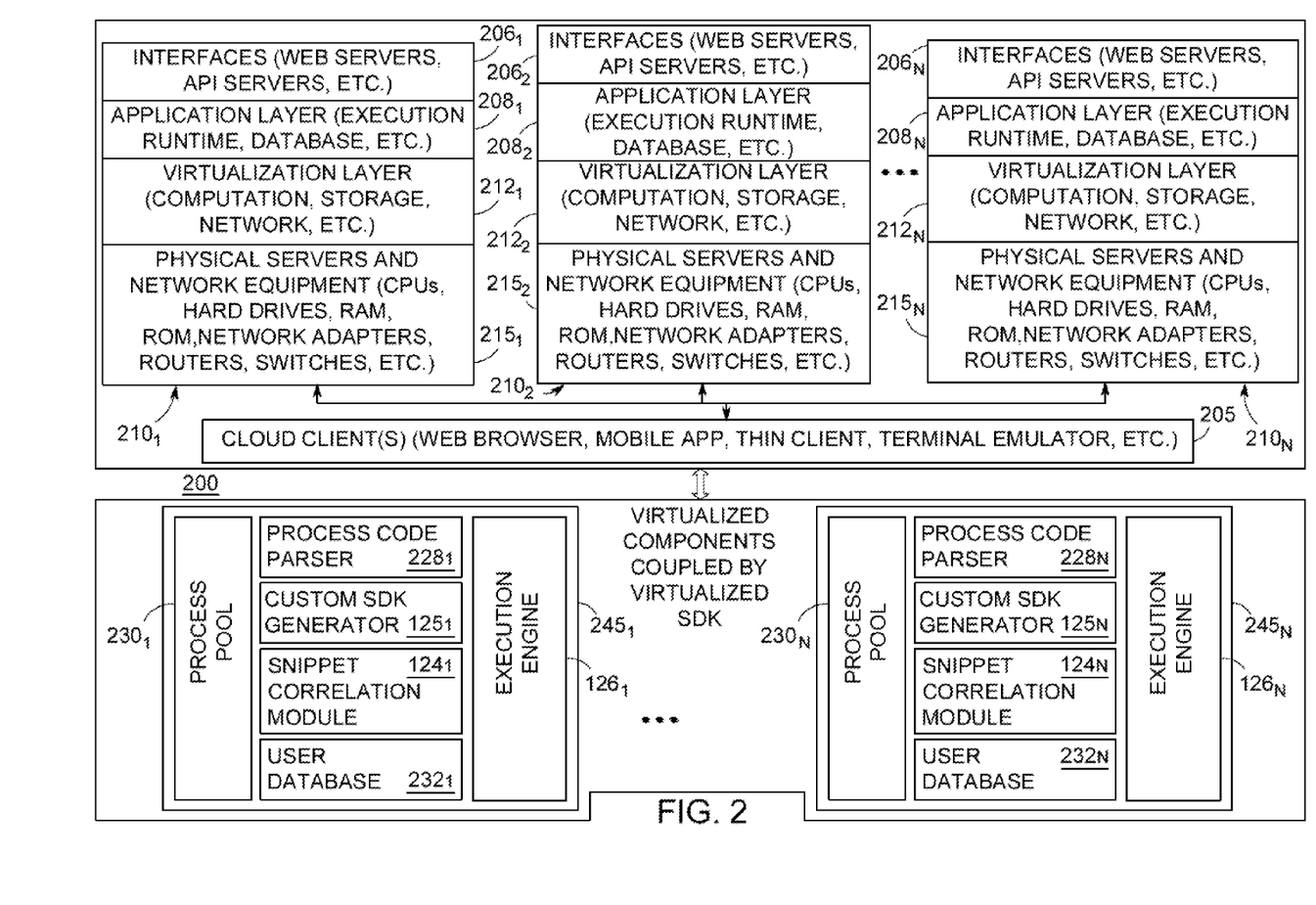
FIG. 2 illustrates a platform to execute classical service components that are interfaced with CLOUD clients using code virtual code providers (VCPs) in accordance with one or more exemplary embodiments of the present invention.

FIG. 2 illustrates a platform 200 to execute classical service components (CSCs) $210_1 \ldots 210_N$ that are interfaced with CLOUD clients 205 using code virtual code providers (VCPs) $245_1 \ldots 245_N$, in accordance with one or more embodiments of the present invention. The platform 200 corresponding to platform 120 that may be stored on the remote server 104a. Hereinafter classical service components $210_1 \ldots 210_N$ are collectively referred to as CSCs 210 and similarly virtual code providers $245_1 \ldots 245_N$ are collectively referred to as VCPs 245. The platform 200 operatively uses a custom SDK that links remote process calls from the user devices 102 to the CSCs $210_1 \ldots 210_N$ via CLOUD client(s) 205 and the VCPs 245.

The CSC $210_1$ comprises a remote interface $206_1$, an application layer $208_1$, virtualization layer $212_1$, and physical equipment $215_1$. Each CSC 210 represents a specific service offered by the platform 200. For example CSC $210_1$ may be an Internet service and corresponding servers (e.g., FACEBOOK, EBAY, POP3 e-mail, TWITTER, AMAZON, SMS, FTP, HTTP, and the like) and CSC $210_2$ may be a computer offering conventional local data information processing (e.g., image rendering, code compiling, data analytics, data storage, and the like).

Physical equipment $215_1$ or machines (CPUs, memory, network routers, and the like) are virtualized in a virtualization layer $212_1$ to make processing and storage resources available to the application layer $208_1$. Virtualization creates redundancy and increased operating bandwidth in a single computer, and even more in embodiments where multiple machines are virtualized. In such embodiments, the processing workload can also be allocated to various equipment based on priority and independent of the physical location.

An application layer $208_1$ allows execution runtime of programs and functionalities such as database operations (e.g., storing account profiles, warehousing data, and the like) on the virtualized machines. A remote interface layer $206_1$ comprises code to access web servers and utilize APIs. The remote interface $206_1$ communicates with the CLOUD client(s) 205 (e.g., a thin client, web browser, mobile application, terminal emulator program, and the like).

The CLOUD client 205 facilitates communication of data to and from the VCPs 245 with the application layer $208_1$. The CLOUD client 205 simplifies the layer interfaces $206_1$, $208_1$, $212_1$, and $215_1$ by presenting a web browser, terminal emulator or other client interface. Aforementioned embodiments of the present invention may utilize the CLOUD client 205 to facilitate remote process call code generation of snippets on the platform 200 using the virtualized SDK. The virtualized SDK links process calls generated and offered by VCPs 245 to the application layer $208_1$.

The VCPs 245 generate custom SDKs and allow the custom SDKs to be available for download and installation onto user devices $102_N$. The VCPs 245 are also enhanced hosted code libraries allowing for virtual sandboxing, normalization, universal language, results parsing, automatic credential verification, simplified oath process, platform maintenance and monitoring. Testing or "sandboxing" the program prior to full deployment of the process and application/program to a remote server has become increasingly important with the addition of multiple remote processes and services contained within a program. The VCPs 245 coordinate snippet process calls using the custom SDK that is downloaded to the user device 102a.

From the perspective of the user device 102a, the VCPs 245 allow for a universal programming language offered through the custom SDK by templating languages such that only component parameters are needed and inserted into pre-generated code. Process results are thus also capable of being quickly parsed. Access is also streamlined by the platform 200 using pre-authentication and stored centralized management of keys to access remote services. Pre-authentication also produces more secure code by preventing of reverse-engineering of code communicated between the user device 102a and platform 200 that may expose sensitive information. The VCPs 245 also normalize programming by reducing processes to the snippet format. Thus, snippets represent a standardized way of writing code.

For example, 5 lines of code to call any process in the CLOUD is considered as code normalization. The VCPs 245 allow the platform 200 to display real-time monitoring and logging of how the created application is performing (e.g., usage statistics, error handling, and the like). The platform 200 also uses the monitoring to maintain the SDKs of respective VCPs such that APIs in the process pools 230 are continually improving to include new methods, versions and parameters.

The VCP $245_1$ comprises a process pool $230_1$, a process code parser module $228_1$, a custom SDK generator $225_1$, a snippet correlation module $124_1$, a user database $232_1$, and an execution engine $126_1$. In some embodiments, a single execution engine 126 may deploy all processes. In further embodiments, the VCP $245_1$ includes a snippet generator to generate snippets as well as an authentication module to verify a user identity for accessing CSCs $210_N$ and the VCPs $245_N$.

For ease of explanation, each of the VCPs 245 corresponds to CSCs 210 in a one-to-one correspondence. However, alternative embodiments may include a different ratio or a single VCP 245 representing the processes of all offered by all CSCs 210. VCPs 245 are stored on remote server(s) 104a in accordance with one or more embodiments of the present invention. The VCPs 245 reduce the remote services offered on the platform 200 of the CSCs 210 to a limited number of executable pre-determined remote processes stored in the process pool 230.

A remote process corresponds to a desired action that may be performed on a given CSC $210_N$. For example, processes for a CSC $210_1$ of FACEBOOK would have a limited process pool $230_1$ of posting a comment, posting a picture, liking a comment or picture, declining a friend request, initiating a friend request, deleting a post and other actions desired by a user. The number of processes in a given process pool 230 is thus limited to the actions available by a service associated with the CSC $210_1$. Continuing the example, there would not be a process in the platform 200 to place a review of a product on FACEBOOK. However, such a process would be processed by the platform 200 as available on AMAZON.

The process code parser $228_1$ analyzes the native code of processes as well as required native SDKs and APIs to deploy the code on the CSCs $210_N$. The process code parser $228_1$ separates and organizes processes by defining parameters of the processes based on relative association with other parameters and role in a functionality of the process. The process code parser $228_1$ examines necessary SDKs or APIs for interfacing and executing the process code on the CSCs 210. The process code parser $228_1$ stores relational information and process code in the process pool $230_1$.

The custom SDK generator $125_1$, receives selection data, indicating the processes/functions offered by the VCP $245_1$ that are selected by the user for executing on the user device $102_1$. The custom SDK generator $125_1$ retrieves native SDKs necessary to deploy the selected processes. The native SDKs may be either stored on the VCPs 245 or CSCs 210. In some embodiments the native SDKs are retrieved on-demand from the CSCs 210 as needed by the custom SDK generator $125_1$.

The custom SDK generator $125_1$ extracts SDK code that corresponds only to the selected processes. Extracted SDK code is then integrated such that multiple processes across multiple native SDKs may utilize a single SDK customized with code only for the execution/deployment of the selected processes. The custom SDK generator $125_1$ generates the custom SDK for download and installation to user devices $102_N$.

The process pool $230_1$ this stores all pre-generated code associated with each process or function offered by the remote platform 200 and corresponding CSCs 210. In some embodiments, the pre-generated code is in the native language necessary for the remote application layer $208_1$ to recognize the pre-generated code processes. In other embodiments, the programming language may be native to a user device 102a for an IDE.

The snippet correlation module $124_1$ receives calls to processes from user devices $102_N$ via the custom SDK installed on the user devices $102_N$. The snippet correlation module $124_1$ also coordinates the communication with multiple native SDKs and APIs across multiple VCPs 245 for cross-platform and cross-service interactions of the CSCs $210_N$. For example, the snippet correlation module $124_1$ coordinates process pools 230 and corresponding native SDKs (e.g., EBAY SDK, TWITTER SDK, SMS SDK, and the like) to form a combined single process call in the custom SDK. Continuing the example, by linking processes from respective process pools, a single process call using the custom SDK on the user device $102_1$ may substantially simultaneously TWEET and SMS text a winning auction on EBAY price matched to a product sold on AMAZON.

In some embodiments, the snippet correlation module $124_1$ also generates a snippet by inserting parameters entered by a user as well as process names to create a snippet using a corresponding custom SDK such that the snippet may call the associated process from the process pool $230_1$. The snippet parameters may be entered using a GUI comprising predetermined fields associated a selected remote process. The snippet parameters may also be retrieved as previously stored in the user database $232_1$ The user database $232_1$ comprising user profiles, histories, and stored credentials for various service bundles. In other embodiments, the snippet may be generated locally on the user device 102a.

In alternative embodiments, the snippet correlation module $124_1$ generates a snippet when called using an API call such as through the simple object access protocol (SOAP), representational state transfer (REST) model, or cURL. The generated snippet is in a programming language specified by the user or required by the platform 200. For example, a user may have a pre-existing program on the user device 102a written in JAVA. An associated snippet would need to have a process call to the custom SDK and platform 200 in the JAVA syntax and corresponding libraries on the user device 102a in order to directly insert the snippet into the pre-existing program.

In embodiments, with an authentication module, the module receives credentials from a user or uses previously entered and stored credentials from a user to access a CSC $210_1$ associated with the VCP $245_1$. The authentication module may authenticate also into the platform 200. The user database $232_1$ is the account database for a given service of a CSC $210_1$. In other embodiments, the user database $232_1$ is a collection of user accounts for authentication into the platform 200. Subsequently, the platform 200 coordinates the authentication across multiple VCPs 245 and associated CSCs 210. For example, a user logging into the platform 200 of a remote server (e.g., TEMBOO servers) similarly will authenticate into an e-mail server and EBAY account using pre-defined credentials stored on the remote server 104a previously submitted by the user.

Lastly, the execution engine $126_1$ executes the selected process from the process pool $230_1$, deploys the process onto another remote server 104n or corresponding CSC $210_1$ to execute the remote process. In some embodiments, the execution engine $126_1$ may also return results to the user database or the user device 102a. In further embodiments, the execution engine $126_1$ also executes the remote process from the process pool $230_1$ when the snippet is used to call the process when imbedded into the local code base or pre-existing program with the custom SDK on the user device 102a.

Figure 3:
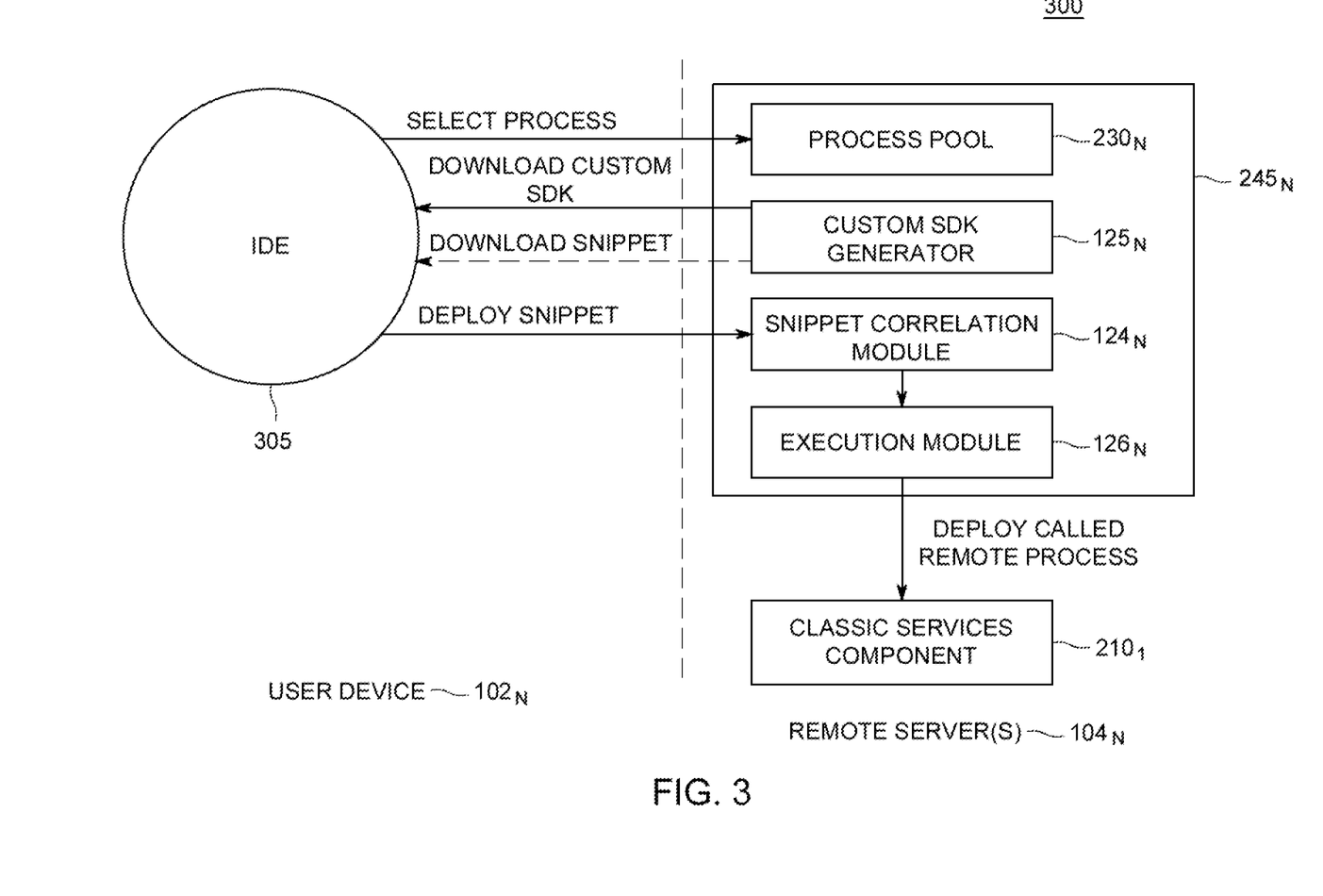
FIG. 3 is an illustration of an overview method using the custom SDK and virtual code providers disclosed in FIG. 2 interfacing with an integrated development environment in accordance with one or more exemplary embodiments of the present invention.

FIG. 3 is an illustration of an overview method 300 using the custom SDK and virtual code providers 245 disclosed in FIG. 2 interfacing with an integrated development environment (IDE) 305 in accordance with one or more embodiments of the present invention. The method 300 utilizes an IDE 305 on a user device 102n, and VCPs 245 stored on remote servers 104n. The method 300 downloads a custom SDK to the IDE 305 to call remote processes in various programming languages and platforms of corresponding CSCs 210 necessary to execute the remote processes. Optional embodiments also include downloading a snippet.

The IDE 305 coordinates a local code base with a remote code base and allows programs or applications to be written locally but yet, include remote process calls using a custom SDK. In operation, a user device 102a displays all the available bundles of processes offered on the VCPs 245, and remote processes for selection by the user. Based on the selection, a custom SDK is returned for installation on the user device $102_N$.

A snippet is either generated on the user device $102_N$ or downloaded to the IDE 305. The snippet comprises parameter data and sequencing data of processes to execute calls of remote processes on the remote server $104_N$.

The IDE 305 then deploys the snippet to the SDK linking module $225_N$. The snippet is deployed using a custom SDK to associate the remote process call of the snippet to the corresponding VCP 245. The snippet correlation module $124_N$ retrieves pre-generated code associated with the selected process and associated native SDK code for a CSC $210_N$. For example, for a CSC $210_N$ corresponding to the AMAZON servers and the process is to purchase an item, the SDK linking module $225_N$ retrieves pre-generated code from the process pool $230_N$ in a native language used to access and execute a purchase on AMAZON servers using parameters submitted from the user parsed from the snippet. Continuing the example, parsed parameters for the AMAZON purchase would include the product name and serial number, a name of the user, shipping address, and credit card information. The pre-generated code inserted with parameters is sent to the execution engine $126_N$ that subsequently deploys the remote process on the corresponding CSC $210_1$.

Figure 4:
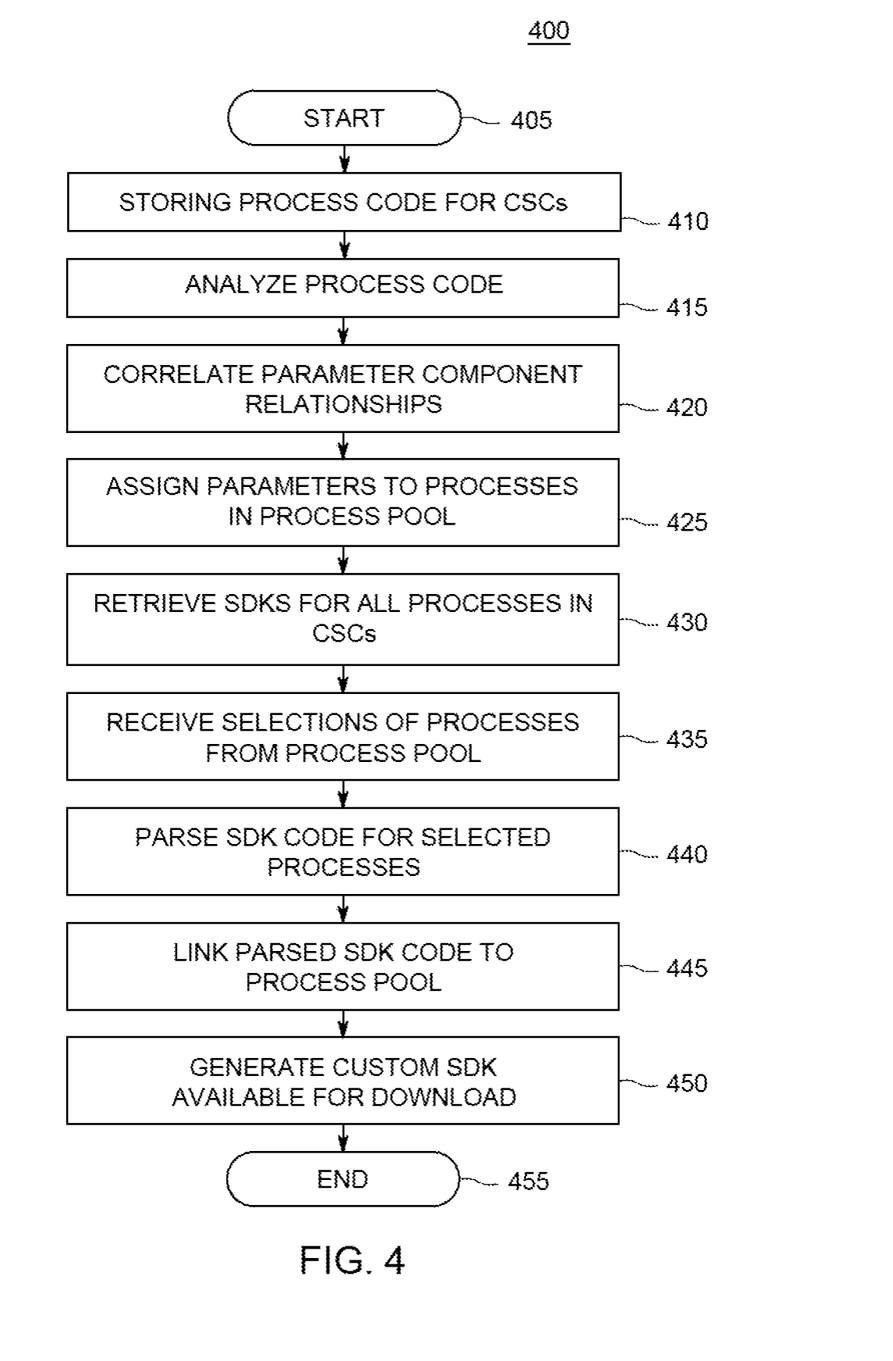
FIG. 4 is a flow diagram for a method of generating a custom SDK in accordance with one or more exemplary embodiments of the present invention.

FIG. 4 is a flow diagram for a method of generating a custom SDK in accordance with one or more embodiments of the present invention. The method may be implemented by system 100 in FIG. 1 and the platform 200 discussed in FIG. 2 above. The method 400 generates remote process calls and a custom SDK to access selected remote process calls.

The method 400 begins at step 405 and continues to step 410 wherein processes code associated with services offered by CSCs 210 are stored into memory (e.g., process pools 230). The process code may be in a native language that is unique to a $CSC_N$. In some embodiments, the VCPs 245 generate the process code or alternatively, the process code may be pre-generated and prepared for insertion of parameter data.

Next at step 415, the process code is analyzed for attributes. Attributes include parameters (e.g., variables), programming language type, as well as necessary SDKs or APIs for interfacing and executing the process code on the CSCs 210. Attributes also include distinguishing parameters based on respective relationships between the parameters and the function of the parameter for a given process. For example, a send e-mail process requires parameters such as an originating e-mail address, destination e-mail address, subject, current time, time to send, and message body.

Next at step 420 the parameters are correlated based on relative relationships to offered processes and role in performing a process on the CSCs 210. In the example, each of the parameters has a specific respective function in the process and relation to the other parameters. A destination e-mail address is allotted to a portion of the process code requiring a destination e-mail that is related with a corresponding message subject and body with the originating e-mail address as an author of the e-mail. The time to send parameter includes a value as to when the e-mail is to be sent, and is accordingly correlated to the function of time for execution within the send e-mail process. In alternative embodiments, the analyzed process code is native to the SDKs and APIs of respective CSCs 210 (e.g., AMAZON, TWITTER, and the like). In some embodiments, relationship information also includes the source of the raw parameter components. Parameter data may be manually entered by the user, automatically entered (e.g., stored authentication keys), conditionally based on the result of another process, or related to a parameter of another process.

At step 425, the parameters are assigned to at least one process in the process pools 230. Continuing the previous example, the originating email address may be assigned to the process for sending an email as well as a login credential to a POP3 server necessary for another process to authenticate into an e-mail server.

At step 430, native SDKs for CSCs 210 are retrieved for all processes in the process pools 230. The native SDKs are utilized by the platform 200 to deploy a specific process on a CSC $210_1$. At step 435, selections of desired processes to be implemented from a user device $102_N$ are received by the remote servers 104.

Next at step 440, SDK code is parsed from native SDKS for each of the selected processes. At step 445, the parsed SDK code is integrated and linked to processes in the process pool and other SDKs and APIs to deploy the processes on the CSCs 210.

At step 450, the custom SDK is generated and stored to be available for download to user devices 102. The method 400 then ends at step 455.

Figure 5:
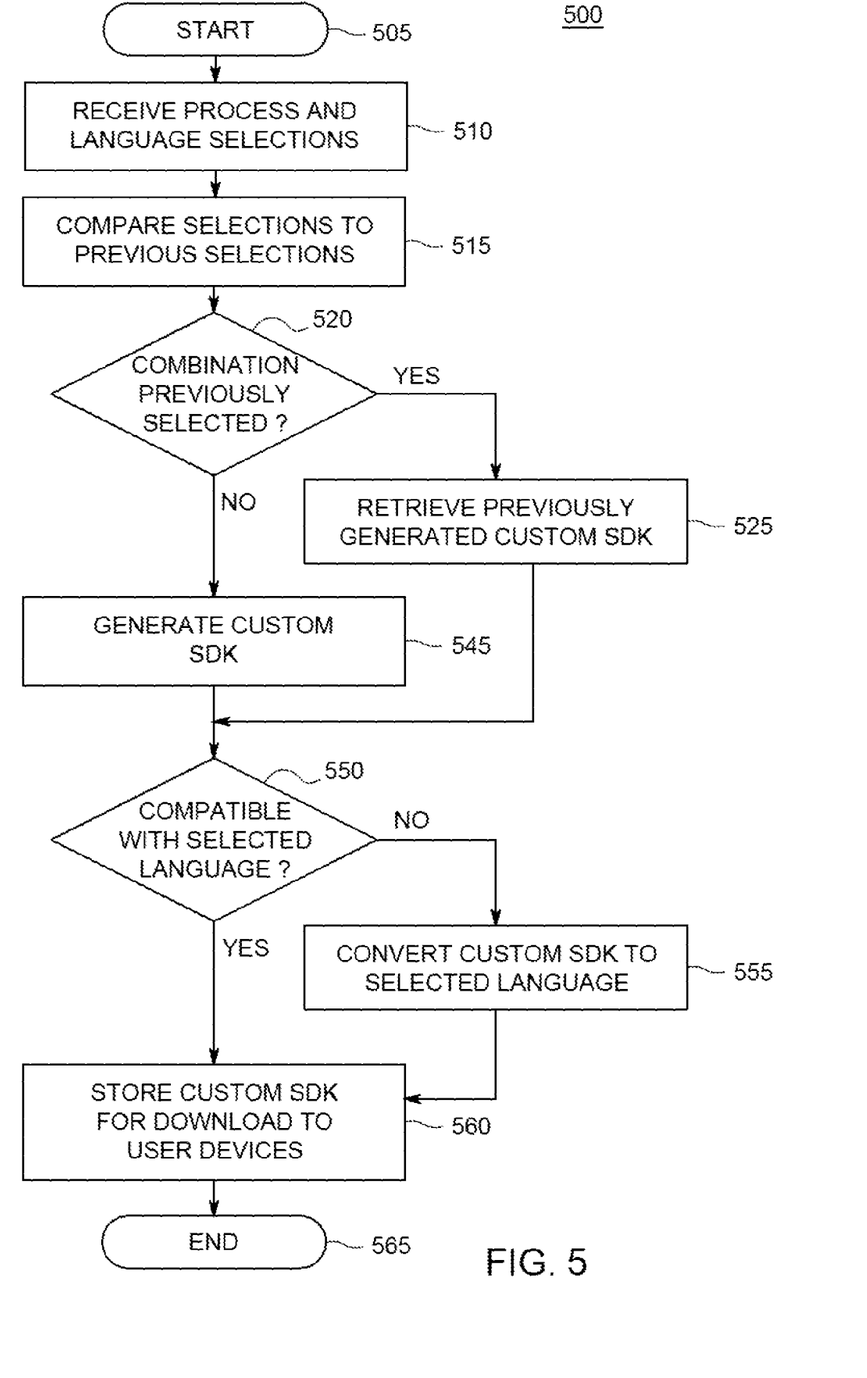
FIG. 5 is a flow diagram of a method for generating a custom SDK with a specific programming language in accordance with one or more exemplary embodiments of the present invention.

FIG. 5 is a flow diagram of a method 500 for generating a custom SDK with a specific programming language in accordance with one or more embodiments of the present invention. Through a custom SDK, the method 500 allows the code base on the user device 102*a* to be small and only include SDK data for processes that are being implemented by the user. The method 500 in optional embodiments includes authenticating into a remote programming platform 200 that processes the remote process calls of the custom SDK. The method 500 uses the authentication to present to the user device $102_N$ previously generated and stored custom SDKs requests by the user device $102_N$ or other user devices $102_{N-1}$.

The method 500 begins at step 505 and continues to step 510 wherein the remote platform 200 receives remote process and programming language selections. In some embodiments, the selected language corresponds to that of the programming language of the IDE 305. In some embodiments, the account of the user is authenticated and associated with previously stored keys and credentials for various remote services of CSCs 210 (e.g., data storage, e-mail, websites, social media, brokerages, banking, and the like). In some embodiments, the platform 200 includes a centralized user account with a profile history of commonly used routines, processes, SDKs, and APIs. The profile history is recorded and updated for both the platform 200 and in the user databases 232 corresponding to associated VCPs 245 and CSCs 210.

The method 500 continues to step 515 wherein the selections of remote processes are compared against a list of selections previously used to generate custom SDKs. If at step 520, a combination of processes was previously, selected, the method 500 proceeds to step 525 to retrieve the previously generated custom SDK. By retrieving a previously generated custom SDK, the same custom SDK is not repeatedly generated and computational resources are conserved on the VCPs 245. However, if at step 520, the method 500 determines the combination of selected processes has not been previously used to generate a custom SDK, the method 500 proceeds to step 530.

At step 545, the custom SDK is generated based on method 400 discussed above. Next, at step 550, a determination is made as to whether the generated custom SDK (or alternatively the retrieved custom SDK) is compatible with the programming language selection received at step 510. If determined at step 550, the custom SDK is incompatible, the method 500 proceeds to step 555. However, if the method 500 determines the custom SDK is compatible, the method 500 proceeds to step 560.

At step 555, the custom SDK is converted to be compatible with the programming language selection. Conversion may link the custom SDK to additional support libraries stored on the VCPs 245 or alternatively stored in the local code base on the user device 102 for the selected language to be operable to call the selected remote processes using the customized SDK from the user device 102. The method then proceeds to step 560.

As an example, support libraries are installed in the local code base to convert between programming languages using metadata (e.g., XML) to tag code for processes in JAVA. The metadata describes the process that is subsequently directly generated as a code snippet using the corresponding metadata in any programming language. In some embodiments, the support libraries are in the custom SDK.

At step 560, the custom SDK is stored and presented to the user devices 102 for download and installation into a local code base. The method 500 ends at step 565.

Figure 6:
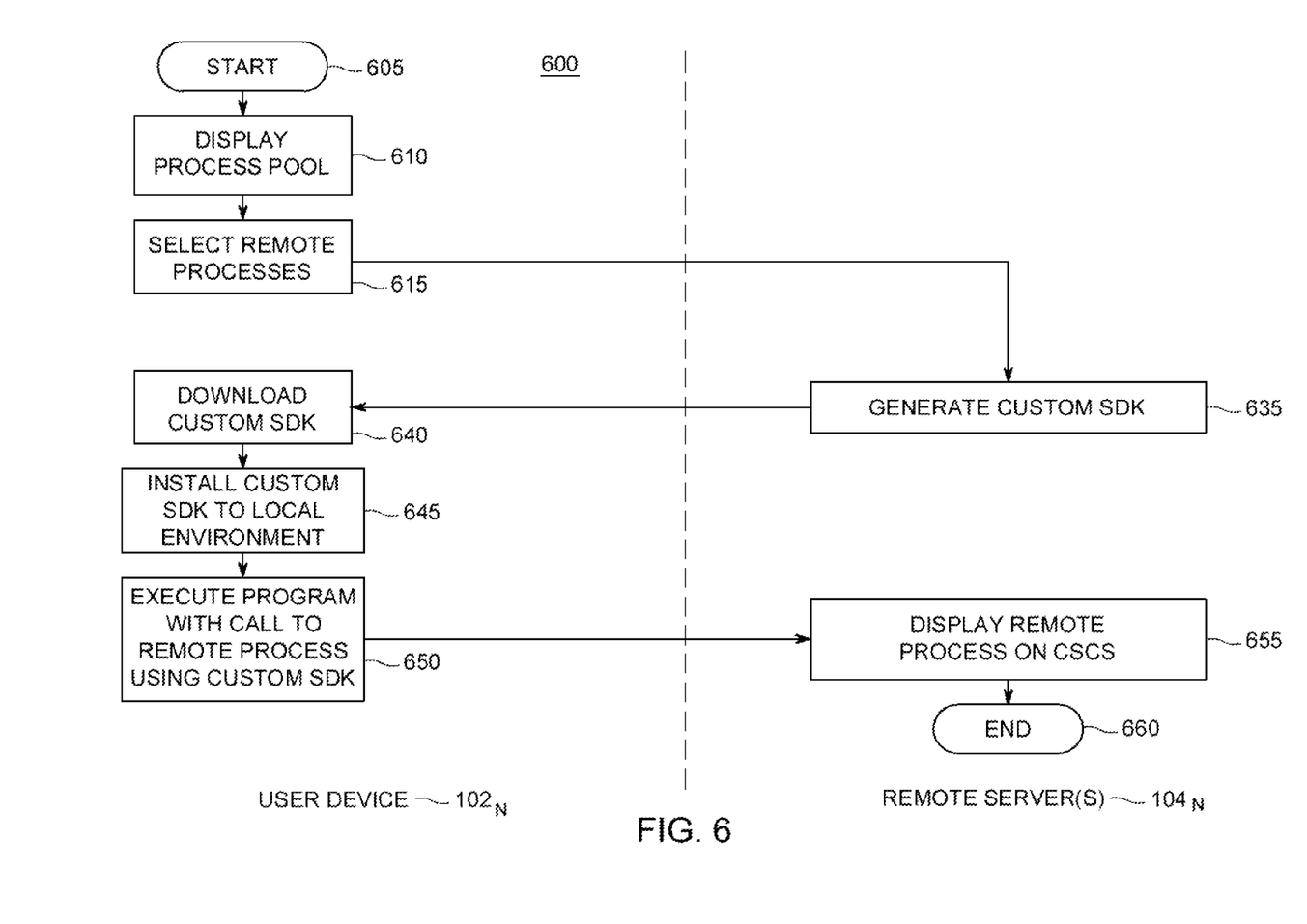
FIG. 6 is a flow diagram of a method for a virtualized process call code-generator for various programming languages using a custom SDK in accordance with one or more exemplary embodiments of the present invention.

FIG. 6 is a flow diagram of a method 600 for a virtualized process call code-generator for various programming languages using a custom SDK in accordance with one or more embodiments of the present invention. The method 600 applies the custom SDK and allows for conversion between various programming languages by utilizing a snippet tailored for the user device 102*a* and/or IDE 305 to call remote processes on CSCs 210. Both the snippet and custom SDK occupy minimal memory space on the user device by using a reduced code set that is specific to processes selected by the user.

The method 600 begins at step 605 and continues to step 610 wherein the collection of remote processes are populated and displayed for the user device 102*a*. In some embodiments the user device 102*a* must login to the remote platform 200 and authentication module such that the user account has access to the remote processes.

Next at step 615, at least one remote process is selected. In some embodiments, the remote process is selected through a graphical user interface (GUI) on the user device 102*a*. In other embodiments, the remote process is specified by calling to the remote process through a function in a custom SDK downloaded to the user device 102*a*.

At step 635, a custom SDK is generated on the remote servers $104_N$ detailed in the method 400 described above. The custom SDK comprises SDK data of only those processes selected by the user. In some embodiments, the processes selected are those intended to be called on the user device. In other embodiments, the processes selected are more than those intended to be called, but less than the total number of offered processes/functions and process bundles by the VCPs 245.

At step 640, the custom SDK is downloaded to the user device $102_N$. At step 645, the custom SDK is installed into the IDE 305 or local development environment on the user device $102_N$.

At step 650, a program (e.g., IDE 305) on the user device 102a locally triggers deployment of the selected remote process with associated process parameters to the remote platform 200. The deployment utilizes the snippets and custom SDK to call the appropriate VCPs 245 and process pools 230 on the remote platform 200.

At step 655, the process is deployed by the remote servers 104 on the corresponding CSCs 210. To deploy, the parameters are parsed from the snippets. Parsing includes directing the parameters to the VCPs for the selected process from process pools 230 as linked through the custom SDK and snippet correlation modules 124. The parsed parameters are inserted into pre-generated code. In some embodiments, the pre-generated code in the native language of the CSCs 210 and in process pools 230. The method 600 ends at step 660.

Figure 7:
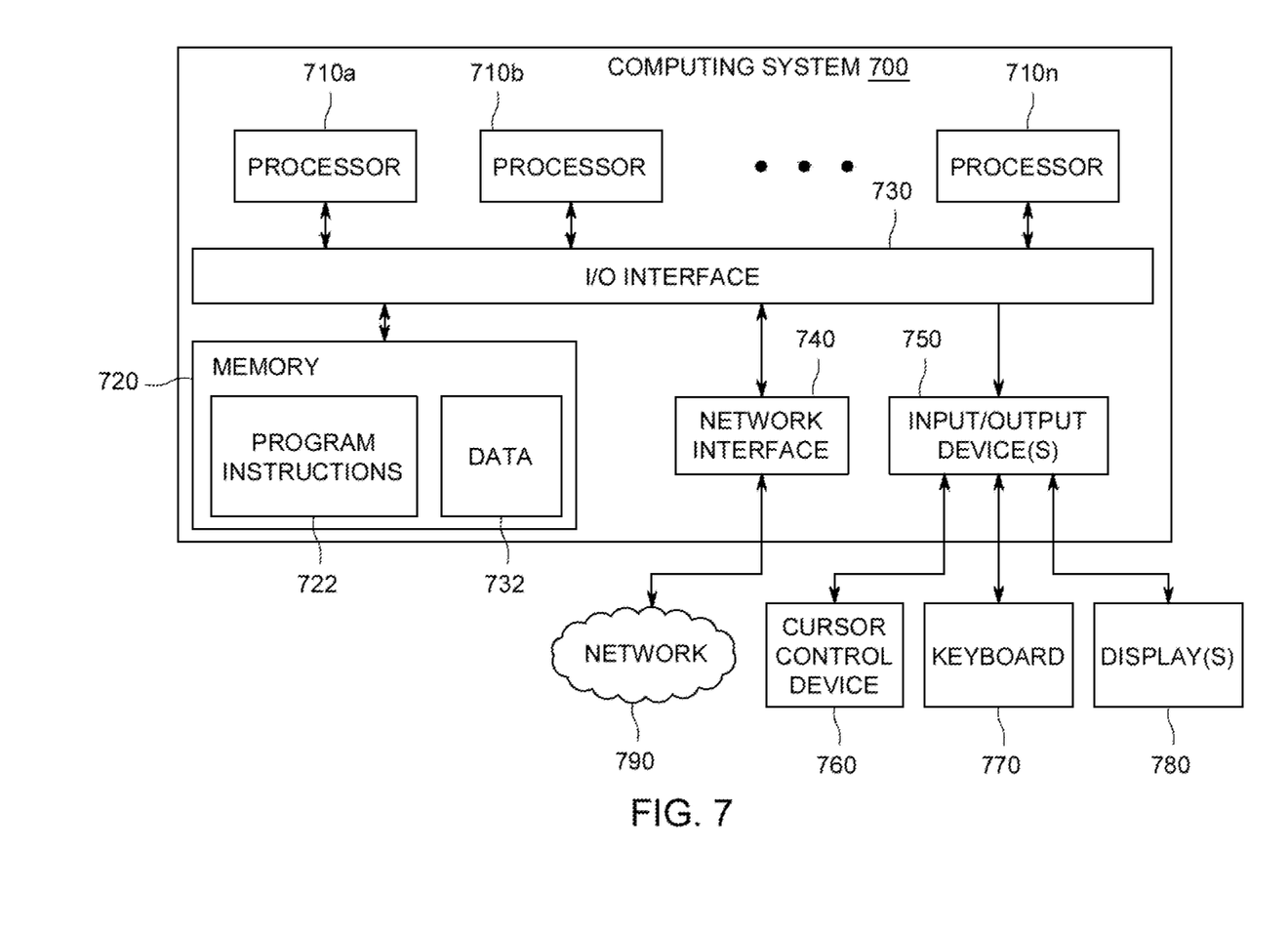
FIG. 7 is a block diagram of modules within an exemplary computing server in accordance with one or more exemplary embodiments of the present invention.

FIG. 7 is a simplified block diagram of modules within an exemplary computing server in accordance with one or more embodiments of the present invention. The computer system 700 comprises substantially similar structure comprising servers or electronic devices in the aforementioned embodiments.

Various embodiments of methods and system for generating a custom SDK for remote process calls, as described herein, may be executed on one or more computer systems, which may interact with various other devices. One such computer system is computer system 700 illustrated by FIG. 7, which may in various embodiments implement any of the elements or functionality illustrated in FIGS. 1-6. In various embodiments, computer system 700 may be configured to implement methods described above. The computer system 700 may be used to implement any other system, device, element, functionality or method of the above-described embodiments. In the illustrated embodiments, computer system 700 may be configured to implement methods 400, 500, and 600 as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 760, such as cursor control device 760, keyboard 770, and display(s) 780. In some embodiments, the keyboard 770 may be a touchscreen input device.

In various embodiments, any of the components may be utilized by the system to route and execute remote process calls as described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). The uniprocessor system including a one processor 710 may split functionality of the single processor to appear as multiple processors for processing and executing simultaneous data of a program. Processors 710 may be any suitable processor capable of executing instructions. For example, in various embodiments, processors 610 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, touchscreens, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the methods described above, such as the methods illustrated by the flowchart of FIGS. 3-6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

An exemplary snippet generated for insertion into a JAVA program that calls the TEMBOO custom SDK includes:

```
package TembooDemoECOs;
import com.temboo.Library.NYTimes.ArticleSearch.QueryArticles;
import com.temboo.Library.NYTimes.ArticleSearch.QueryArticles.QueryArticlesInputSet;
import com.temboo.Library.NYTimes.ArticleSearch.QueryArticles.QueryArticlesResultSet;
import com.temboo.core.TembooException;
import com.temboo.core.TembooSession;
public class TembooDemoECOs {
/**
* @param args
* @throws TembooException
*/
    public static void main(String[ ] args) throws TembooException {
        // Instantiate a Temboo session
            TembooSession session = new TembooSession("demo", "myFirstApp", "6d975bf6-e761-47c7-8");
        // Instantiate the Choreo, using a previously instantiated TembooSession object
            QueryArticles queryArticlesChoreo = new QueryArticles(session);
        // Get an InputSet object for the choreo
            QueryArticlesInputSet queryArticlesInputs = queryArticlesChoreo.newInputSet( );
        // Set credential to use for execution
            queryArticlesInputs.setCredential("NYTimesCred");
        // Set inputs
        queryArticlesInputs.set_Query("obama");
        // Execute Choreo
QueryArticlesResultSetqueryArticlesResults=queryArticlesChoreo.execute(queryArticlesInputs);
        // Print results using ECOs
        for (int i = 0; i < queryArticlesResults.getArticles( ).length; i++)
    {System.out.println(queryArticlesResults.getArticles( )[i].getTitle( ) + " :: " + queryArticlesResults.getArticles( )[i].getByLine( ));
            }
        }
    }
```

In the above example, the snippet comprises five lines of code capable of being inserted into any JAVA program. Beginning with code for "Instantiate a Temboo session" and ending with code for "Execute Choreo". These lines of code are capable of being edited in a local IDE as text and edited in the future so as the user knows the names of choreos he or she would like to call. The line "package TembooDemoECOs;" calls the custom SDK by import of a specific class: QueryArticles. The above example is possible with installation the following exemplary SDK that comprises the code for QueryArticles:

```java
public class QueryArticles extends Choreography
{
    /**     Create a new instance of the QueryArticles Choreo. A TembooSession
object, containing a valid set of Temboo credentials, must be supplied. */
    public QueryArticles(TembooSession session) {
        super(session,
TembooPath.pathFromStringNoException("/Library/NYTimes/ArticleSearch/QueryArticles"));
    }
    /**     Obtain an InputSet object, used to define inputs for an
execution of this Choreo. @return QueryArticlesInputSet
    */
    public QueryArticlesInputSet newInputSet( ) {
        return new QueryArticlesInputSet( );
    }
    /**
    * Execute the Choreo using the specified InputSet as parameters, wait for
the Choreo to complete and return a ResultSet containing the execution results.
    * @param choreoInputs
    * @return
    * @throws TembooException
    */
    @Override
    public QueryArticlesResultSet execute(InputSet choreoInputs) throws
TembooException {
        JSONObject result = super.executeWithResults(choreoInputs);
        return new QueryArticlesResultSet(result);
    }
    /**             An InputSet with methods appropriate for specifying the inputs
to the QueryArticles Choreo. The InputSet object is used to specify input
parameters when executing this choreo.
    */
    public static class QueryArticlesInputSet extends InputSet {
        /**     Set the value of the APIKey input for this Choreo.
        @param String - (required, string) The API Key provided by NY Times.
        */
        public void set_APIKey(String value) {
            this.setInput("APIKey", value);
        }
        /**     Set the value of the BeginDate input for this Choreo.
        @param String - (optional, date) Sets the starting point (which is inclusive)
of the range of publication dates to return. Must be used with EndDate. Date should
be formatted like YYYYMMDD.
        */
        public void set_BeginDate(String value) {
            this.setInput("BeginDate", value);
        }
        /**     Set the value of the EndDate input for this Choreo.
        @param String - (optional, date) Sets the end point (which is inclusive)
of the range of publication dates to return. Must be used with BeginDate. Date
should be formatted like YYYYMMDD.
        */
        public void set_EndDate(String value) {
            this.setInput("EndDate", value);
        }
            /**     Set the value of the Facets input for this Choreo.
            @param String - (optional, string) A comma-delimited list of up
to 5 facets. This indicates the sets of facet values to include in the response. See
Choreo documentation for more information about accepted values for this input.
            */
            public void set_Facets(String value) {
                this.setInput("Facets", value);
            }
            /**     Set the value of the Fields input for this Choreo.
            @param String - (optional, string) A comma-delimited list of fields to
return. These fields are returned by default: body, byline, date, title, and url.
            */
            public void set_Fields(String value) {
            this.setInput("Fields", value);
        }
            /**     Set the value of the Offset input for this Choreo.
            @param Integer - (optional, integer) This corresponds to which set of
10 results is returned. Used to page through results. Set to 0 to return records 0-9,
set to 1 to return records 10-19, etc.
            */
            public void set_Offset(Integer value) {
            this.setInput("Offset", value);
            }
            /**     Set the value of the Offset input for this Choreo as a
String.
            @param String - (optional, integer) This corresponds to which
```

```
set of 10 results is returned. Used to page through results. Set to 0 to return records
0-9, set to 1 to return records 10-19, etc.
                */
               public void set_Offset(String value) {
                       this.setInput("Offset", value);
               }
               /**      Set the value of the Query input for this Choreo.
                @param String - (required, string) Search keywords (optionally
applied to specific fields) and/or facets. See Choreo documentation for syntax
examples.
                */
               public void set_Query(String value) {
               this.setInput("Query", value);
               }
               /**      Set the value of the Rank input for this Choreo.
                @param String - (optional, string) Sets the order of the results.
Accepted values are: newest (the defaults), oldest, or closest.
                */
               public void set_Rank(String value) {
                       this.setInput("Rank", value);
               }
       }
               /**      A ResultSet with methods tailored to the values returned by the
QueryArticles Choreo. The ResultSet object is used to retrieve the results of a
Choreo execution.
                */
               public static class QueryArticlesResultSet extends ResultSet {
               public QueryArticlesResultSet(JSONObject doc) throws
TembooException {
               super(doc);
               }
               /**      Retrieve the value for the "Response" output from this Choreo
execution
                @return String - (json) The response from the NY Times API.
                */
               public String get_Response( ) {
               return this.getResult("Response");
               }
               /** The value of offset corresponds to a set of 10 results (i.e. offset=0
for results 0-9, offset=1 for results 10-19, etc)
                */
               public String getOffset( ) {
                       return (String)
((JSONObject)getJSONFromString(this.getResult("Response"))).opt("offset");
               }
               /** Get an article matching the search criteria         */
               public NYTimesArticle[ ] getArticles( ) {
                   JSONArray list = (JSONArray)
((JSONObject)getJSONFromString(this.getResult("Response"))).opt("results");
                       NYTimesArticle[ ] resultArray = new NYTimesArticle[(list != null) ?
list.length( ) : 0];
                       if(list != null) {
                   for(int i=0; i<list.length( ); i++) {
                               try {
                                   resultArray[i] = new NYTimesArticle(list.get(i));
                               } catch (JSONException e) { }
                       }
                       }
                       return resultArray;
               }
               /** Contains the search tokens provided for the query
       */
               public String[ ] getTokens( ) {
                       JSONArray list = (JSONArray)
((JSONObject)getJSONFromString(this.getResult("Response"))).opt("tokens");
                       String[ ] resultArray = new String[(list != null) ? list.length( ) : 0];
                       if(list != null) {
                               for(int i=0; i<list.length( ); i++) {
                               try {
                                   resultArray[i] = (String) list.get(i);
                               } catch (JSONException e) { }
                       }
                       }
                       return resultArray;
               }
                       /** The total number of articles for this search        */
               public Number getTotal( ) {
                       return (Number)
((JSONObject)getJSONFromString(this.getResult("Response"))).opt("total");
```

```
            }
          }
       }
}
```

By installing the above exemplary custom SDK, the snippet may now execute calls to remote processes. The code snippet links to the custom SDK code to call the actual process on the remote server 104*a* through the associated VCPs 245. In some embodiments, the SDK comprises insuring the input parameters are in the proper format and then calling the corresponding remote process. In the above example a "choreo" is a graphical representation of a remote process on the user device 102*a* and/or local IDE 305.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method operative to generate a customized software development kit (SDK) in a virtual code provider (VCP) comprising a memory and a processor, configured to perform the steps of the method, the method comprising:
   analyzing a plurality of process code corresponding to a plurality of predefined functions offered by at least two classical service components (CSCs);
   retrieving native SDKs for each function of the plurality of functions;
   receiving a programming language selection for a custom SDK;
   determining whether the custom SDK is compatible with the programming language selection and converting the custom SDK if determined the custom SDK is incompatible;
   receiving, from a user device remote to the VCP, a selection of at least two functions among the plurality of predefined functions;
   parsing SDK code from the native SDKs for the at least two selected functions;
   linking the parsed SDK code;
   storing the linked parsed SDK code as the custom SDK;
   authenticating into the VCP and comparing the received selection with previous selections by users; and
   determining a previously generated custom SDK has been generated for the received selections and transmitting the previously generated custom SDK,
   wherein each of the at least two CSCs are operable to provide a remote service to the user device.

2. The method of claim 1, further comprising correlating parameters of the plurality of processes based on relationships to other parameters and at least one associated function of the process code.

3. The method of claim 1, further comprising storing the custom SDK for download to the user device.

4. The method of claim 1, wherein linking the parsed SDK code further comprises coordinating parsed portions of the native SDKs such that the portions are operative to execute the selected at least two functions on the at least two corresponding CSCs.

5. The method of claim 1, further comprising populating a list of all available functions of the VCP for display on the user device.

6. The method of claim 1, further comprising utilizing the custom SDK to execute the at least two functions on the VCP and deploy an associated process on the at least two CSCs.

7. A method operative to access a customized software development kit (SDK) in a virtual code provider (VCP) comprising a memory and a processor, configured to perform the steps of the method, the method comprising:
   receiving a programming language selection for a custom SDK;
   determining whether the custom SDK is compatible with the programming language selection and converting the custom SDK if determined the custom SDK is incompatible;
   authenticating into the VCP and comparing the received selection with previous selections by users;
   determining a previously generated custom SDK has been generated for the received selections and transmitting the previously generated custom SDK;
   receiving the custom SDK from the VCP;
   installing the custom SDK from the VCP on a user device in a local development environment;
   executing a program with process calls to the custom SDK executing functions corresponding to the process calls as offered by the VCP; and
   deploying functions from the VCP onto classical services components (CSCs) associated with the functions, wherein the CSCs are operable to provide a remote service to the user device, and wherein the custom SDK comprises code from native SDKs corresponding to at least two CSCs.

8. The method of claim 7, wherein executing the program with process calls further comprises transmitting parameter data for functions in snippets to the VCP.

9. The method of claim 8, further comprising correlating snippets to stored predefined processes in the VCP.

10. The method of claim 7, wherein deploying functions further comprises coordinating native SDK code on the VCP for at least one CSC.

11. A system for remote process call generation comprising:
  a) at least one processor;
  b) at least one input device coupled to at least one network; and
  c) at least one storage device storing processor executable instructions which, when executed by the at least one processor, performs a method including:
    i. analyzing a plurality of process code corresponding to a plurality of predefined functions offered by at least two classical service components (CSCs);
    ii. retrieving native SDKs for each function of the plurality of functions;
    iii. receiving a programming language selection for the custom SDK;
    iv. determining whether the custom SDK is compatible with the programming language selection and converting the custom SDK if determined the custom SDK is incompatible;
    v. receiving, from a user device, a selection of at least two functions among the plurality of predefined functions;
    vi. parsing SDK code from the native SDKs for the at least two selected functions;
    vii. linking the parsed SDK code; and
    viii. storing the linked parsed SDK code as a custom SDK;
    ix. authenticating into the VCP and comparing the received selection with previous selections by users; and
    x. determining a previously generated custom SDK has been generated for the received selections and transmitting the previously generated custom SDK,
  wherein each of the at least two CSCs are operable to provide a remote service to the user device.

12. The system of claim 11, further comprising correlating parameters of the plurality of processes based on relationships to other parameters and at least one associated function of the process code.

13. The system of claim 11, further comprising storing the custom SDK for download to a user device.

14. The system of claim 11, wherein linking the parsed SDK code further comprises coordinating parsed portions of the native SDKs such that the portions are operative to execute the selected at least two functions on the at least two corresponding CSCs.

* * * * *